United States Patent [19]
Awano et al.

[11] 3,843,920
[45] Oct. 22, 1974

[54] INVERTER CONTROLLING CIRCUIT

[75] Inventors: Tsuneo Awano; Kazutoshi Onishi, both of Yokohama; Isao Masuzawa, Saitama-ken, all of Japan

[73] Assignee: Tokyo Keiki Co., Ltd., Tokyo, Japan

[22] Filed: July 24, 1973

[21] Appl. No.: 382,202

[30] Foreign Application Priority Data
July 26, 1972  Japan.................. 47-87985

[52] U.S. Cl. ............................................. 321/44
[51] Int. Cl. ............................................. H02m 7/52
[58] Field of Search ..................... 321/43–45 R

[56] References Cited
UNITED STATES PATENTS

| | | |
|---|---|---|
| 3,259,827 | 7/1966 | Strohmeier et al. .......... 321/45 R X |
| 3,333,179 | 7/1967 | Freeman .......................... 321/45 R |
| 3,364,413 | 1/1968 | Abraham ........................ 321/44 X |
| 3,413,539 | 11/1968 | Lopitzsch...................... 321/45 R |
| 3,657,631 | 4/1972 | Martens et al. ............. 321/45 R X |

*Primary Examiner*—R. N. Envall, Jr.

[57] ABSTRACT

An inverter controlling circuit comprising a first and a second master-slave flip-flop circuit, a time constant circuit connected to the first master-slave flip-flop circuit and a control signal generating circuit connected to the prescribed output terminals of said first and second master-slave flip-flop circuits, wherein the first and second switching elements of an inverter are impressed with a D.C. source voltage, and at the same time the prescribed input terminals of the first and second-master slave flip-flop circuits and the time constant circuit are supplied with a signal of "1", and in a prescribed length of time after impression of the D.C. source voltage, two control signals having a fixed pulse width and displaced 180° in phase from each other are conducted from the control signal generating circuit to the first and second switching elements.

2 Claims, 11 Drawing Figures

| CL | Qn+1 |
|---|---|
| 0 | 0 |
| 1 | Qn |

| J | K | Qn+1 |
|---|---|---|
| 0 | 0 | Qn |
| 1 | 0 | 1 |
| 0 | 1 | 0 |
| 1 | 1 | Q̄n |

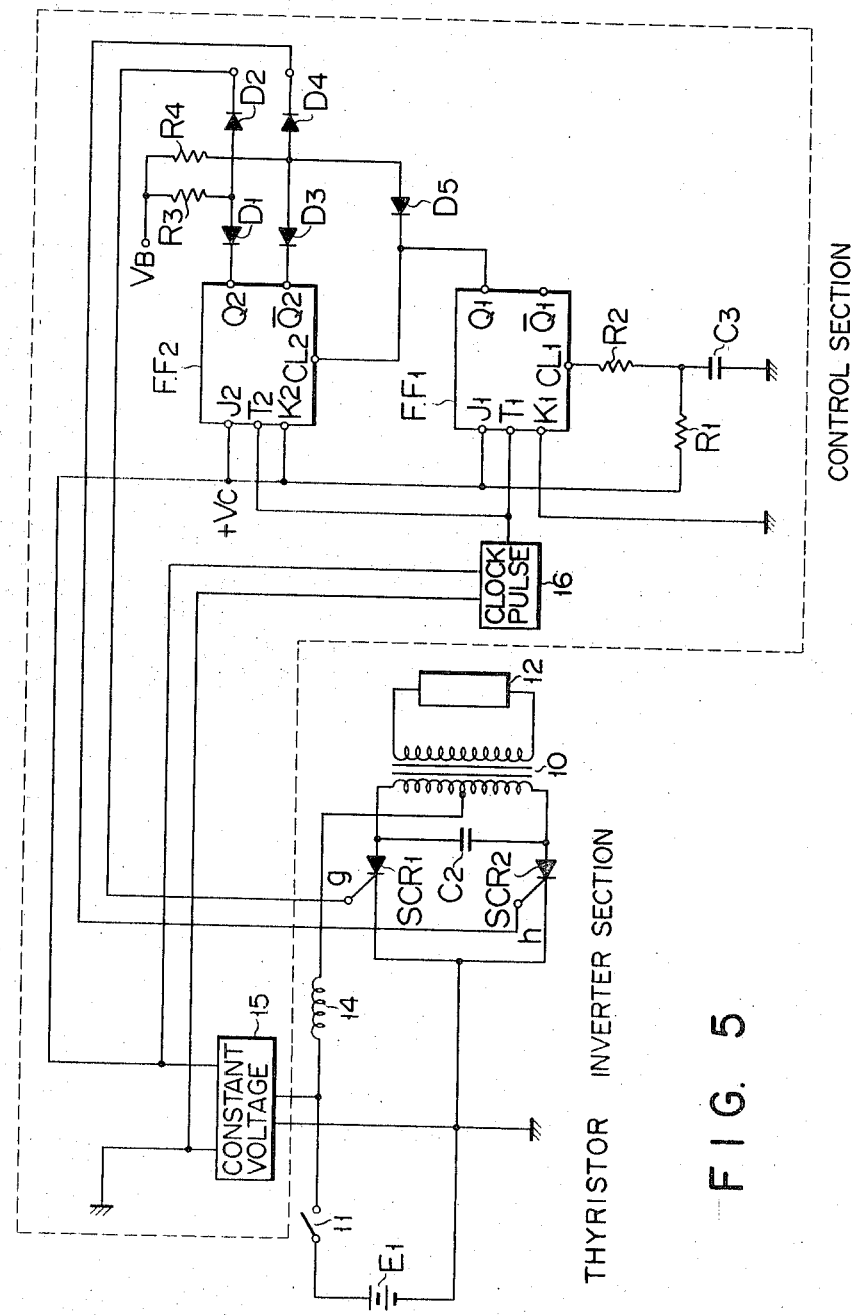
F I G. 5

INVERTER CONTROLLING CIRCUIT

This invention relates to an inverter controlling circuit using a pair of JK master-slave flip-flop circuits.

Typical are the transistor inverter wherein the first and second switching elements consist of parallel connected transistors and the thyristor inverter wherein the parallel connected thyristors consist of silicon controlled rectifiers.

The transistor inverter has the arrangement of FIG. 1 excluding the section enclosed in broken lines. To both ends of the primary winding of an output transformer 10 are connected in series a first and a second switching transistor TR1 and TR2 with the indicated polarities. A D.C. source E1 is connected with the indicated polarity between the junction of the emitters of both transistors TR1 and TR2 and the neutral point of the primary winding through a switch 11. Between the ends of the secondary winding of the transformer 10 is connected a load 12. A capacitor C1 is provided to reduce the impedance of the power source.

The thyristor inverter has the arrangement of FIG. 5 excluding the section enclosed in broken lines. To both ends of the primary winding of a transformer 10 are connected a first and a second thyristor SCR1 and SCR2 with the indicated polarities. The D.C. source E1 is connected with the indicated polarity between the junction of the cathodes of both SCR's and the neutral point of the primary winding. Between the ends of the primary winding is connected a commutating condenser C2. The above-mentioned two types of inverter are operated, as is well known, by self-excitation and external excitation.

With the self-excited inverter, there is separately provided an LC oscillation circuit, an oscillation output from which alternately energizes the first and second switching elements. However, the LC oscillation circuit consumes due to its specific time constant a certain amount of time to attain a normal oscillating condition after it commences operation, namely, is subject to a certain degree of time delay. Accordingly, the self-excited inverter using the LC oscillation circuit has the drawback that it presents an unstable initial operation.

With the externally excited inverter, there is often separately provided a control circuit for delivering a control signal to the switching elements of said inverter upon receipt of a clock pulse from a relaxation oscillation circuit using a unijunction transistor.

With the transistor inverter, the transistor switching elements have to be supplied with a control signal having a rectangular wave voltage. Accordingly, the control circuit for the transistor inverter is formed of a hybrid rectangular wave oscillation circuit consisting of a combination of a relaxation oscillation circuit using the unijunction transistor and a flip-flop circuit. However, the transistor inverter circuit including a capacitor for reducing the power source impedance has the drawbacks that a certain length of time is required for the switching transistor to be impressed with a regular D.C. voltage, and that the capacitor included in the time constant circuit of the relaxation oscillation circuit presents different amounts of residual charged energy between the initial and normal operations, resulting in different oscillation frequencies between the initial and normal operations (namely, a longer oscillation period in the initial operation than in the normal operation).

These drawbacks jointly cause the output transformer 10 to be sometimes saturated, leading to the unstable initial operation of the inverter. To resolve the above-mentioned difficulties, it is necessary to provide means for stabilizing the oscillation period of the relaxation oscillation circuit from the very start of its operation and means for impressing a control signal at the exact moment the switching transistor is impressed with a normal D.C. voltage. Provision of such means, however, generally complicates the arrangements of a control device.

Unlike the transistor inverter, the thyristor inverter has to be stopped, once a commutation failure occurs. When such event is eliminated, the inverter has to be started a second time. To avoid this inconvenience, it is necessary to supply a control signal having a rectangular wave voltage and presenting good rising characteristics. To this end, there is applied the process of energizing a supplementary resistance load type inverter for forming a trigger signal by an output from the relaxation oscillation circuit using a unijunction transistor so as to control a rectangular wave output from said supplementary inverter. Even with the thyristor inverter, however, there is raised the problem that if the relaxation oscillation circuit has a longer oscillation period in the initial operation than in the normal operation, then an output transistor designed to match the oscillation period in the normal operation will be soon saturated, and this saturation will give rise to a commutation failure and in consequence the stoppage of the thyristor inverter. When, therefore, the thyristor is impressed with a normal D.C. voltage, the thyristor inverter should be supplied with a control signal consisting of a rectangular wave pulse and presenting an accurate frequency and good rising characteristics from the initial operation.

It is accordingly the object of this invention to provide an inverter controlling circuit of simple arrangement which enables a switching element to be supplied with a good rectangular wave pulse having an accurate repeating period from the very moment said switching element is impressed with a normal D.C. voltage.

This invention relates to an inverter controlling circuit whereby a D.C. source circuit is periodically switched by a first switching element controlled by a first signal and a second switching element controlled by a second signal, so as to supply a load with alternating current. This inverter controlling circuit is arranged as follows. Namely, the inverter controlling circuit comprises a pair of first and second master-slave flip-flop circuits each provided with input terminals J, T and K, a clear terminal CL and output terminals Q and $\bar{Q}$, wherein the J terminal of the first masterslave flip-flop circuit and the J and K terminals of the second master-slave flip-flop circuit are connected together to be supplied with a signal "1" when the switching elements are impressed with the D.C. source voltage, the J terminals of the first and second master-slave flip-flop circuits are connected together to be supplied with a clock pulse, the K terminal of the first master-slave flip-flop circuit is kept at a "0" level, and the Q terminal of the first masterslave flip-flop circuit is connected to the CL terminal of the second master-slave flip-flop circuit; a time constant circuit which is energized when the jointly connected terminals J, T and K of the paired master-slave flip-flop circuits are supplied with a "1" signal and, after the prescribed length of time after said energization, delivers a "1" signal to the CL terminal of the first master-slave flip-flop circuit; and a control signal supplying circuit which is connected to the Q and $\overline{Q}$ terminals of the second master-slave flip-flop circuit and the Q terminal of the first master-slave flip-flop circuit, and supplies the first switching element with a first signal consisting of an output from the Q terminal of the second master-slave flip-flop circuit, and also the second switching element with a second signal consisting of an AND output derived from an output from the $\overline{Q}$ terminal of the second master-slave flip-flop circuit and an output from the Q terminal of the first master-slave flip-flop circuit.

This invention enables a switching element to be supplied with a control signal consisting of a rectangular wave pulse and presenting a fixed frequency and good rising characteristics from the very start in the prescribed length of time after the switching element is impressed with a D.C. source voltage, namely, when the voltage impressed on the switching element attains the prescribed level, thereby eliminating the drawbacks accompanying the prior art inverter controlling circuit by a control device of simple arrangement. Further, this invention makes it easy to determine which of both switching elements should be rendered conducting first.

This invention can be more fully understood from the following detailed description when taken in connection with reference to the accompanying drawings, in which.

Figure 1:
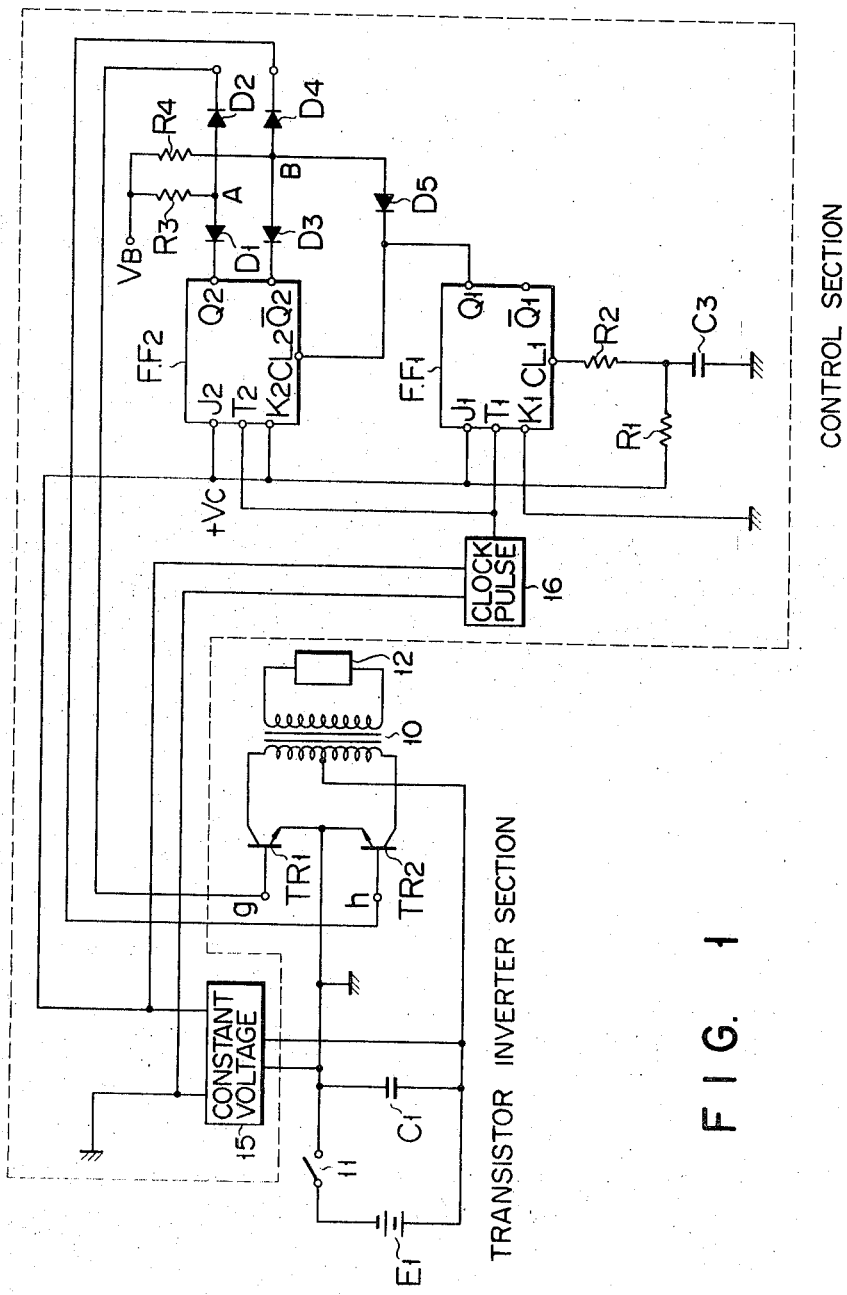
FIG. 1 is a circuit diagram where an inverter controlling circuit embodying this invention is shown relative to a transistor inverter section.

FIG. 4 presents wave forms illustrating the operation of the inverter-controlling circuit of FIG. 1; and FIG. 5 is a circuit diagram where an inverter controlling circuit embodying the invention is indicated relative to a thyristor inverter section.

The arrangement of an inverter consisting of parallel connected transistors which is shown outside of the broken lines of FIG. 1 has already been described, further reference thereto being omitted. The inverter controlling circuit of this invention enclosed in the indicated broken lines comprises a first master-slave flip-flop circuit FF1 and a second master-slave flip-flop circuit FF2. Each master-slave flip-flop circuit is provided with signal receiving terminals J and K, a clock pulse receiving terminal T, clear signal receiving terminal CL and output terminals Q and $\overline{Q}$. The terminals of the FF1 circuit are marked with a suffix 1 and those of the FF2 circuit with a suffix 2. The terminals J1, J2 and K2 are joined together to be supplied with a signal "1" namely, with a voltage of the indicated +Vc. According to this embodiment, a constant voltage means 15 is provided between both terminals of the power source E1. When the switch 11 is thrown in, an output voltage +Vc from said constant voltage means 15 is supplied as a "1" signal to the aforesaid jointly connected terminals J1, J2 and K2. The terminals T1 and T2 are connected together to be supplied with a clock pulse from a clock pulse generator 16, which is actuated when the power source E1 is operated. The terminal K1 is earthed to be kept at a "0" level. The terminal Q1 is connected to the terminal CL2.

The inverter controlling circuit of this invention further comprises a time constant circuit consisting of a resistor R1 and capacitor C3. One terminal of the resistor R1 is connected to the power source generating a voltage +Vc and the junction of the resistor R1 and capacitor C3 is connected to the CL1 terminal through a resistor R2. In the prescribed length of time after impression of a voltage +Vc, the CL1 terminal is supplied with a "1" signal.

The subject inverter controlling circuit further includes a circuit for delivering a control signal to the switching transistor. This control signal generating circuit comprises a first diode D1 having its cathode connected to the terminal Q2; a second diode D2 whose anode is connected to the anode of the first diode D1 and whose cathode constitutes the output terminal of a first control signal, namely, a control signal g for a first transistor TR1; a third diode D3 having its cathode connected to the terminal $\overline{Q}2$; a fourth diode D4 whose anode is connected to the anode of the third diode D3 and whose cathode constitutes the output terminal of a control signal h for a second switching transistor TR2; a fifth diode D5 having its cathode connected to the terminal Q2 and its anode connected to the anode of the third and fourth diodes D3 and D4; and a biasing means for impressing a bias voltage VB on the anodes of the first and second diodes D1 and D2 through a resistor R3 and the anodes of the third and fourth diodes D3 and D4 through a resistor R4.

Figures 2, 3:
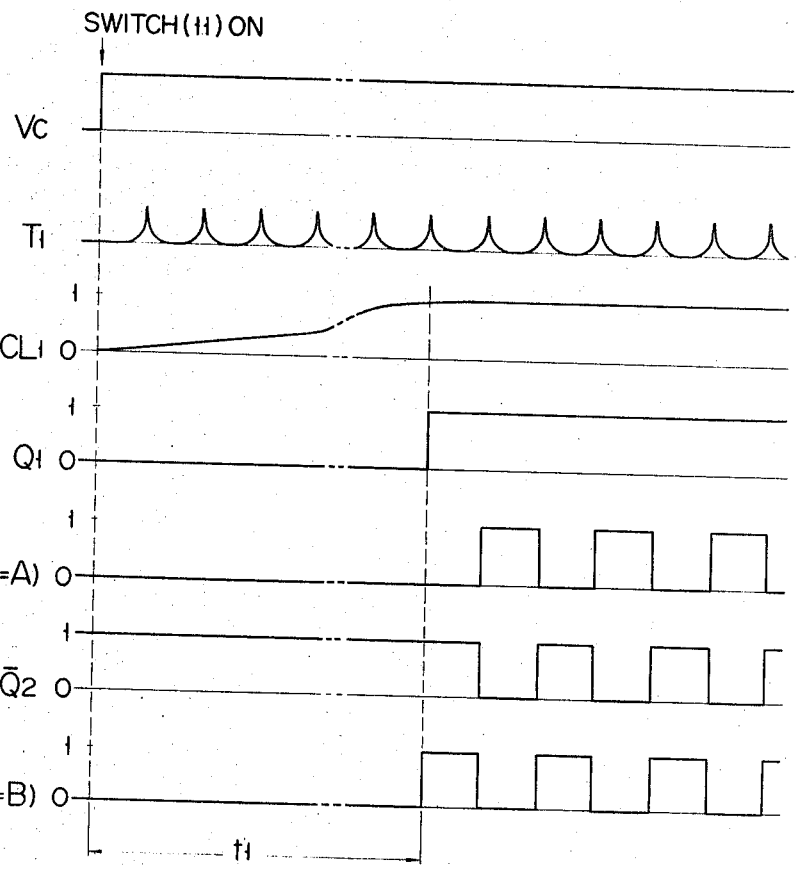
FIGS. 2 and 3 are the truth tables of master-slave flip-flop circuits used in the invention.

The inputs and outputs of the FF1, FF2 circuits bear the relationships indicated in the truth tables of FIGS. 2 and 3. Namely, as shown in FIG. 2, when the clear terminal CL is supplied with a "0" signal, an output from the Q terminal is kept at a "0" level regardless of the kind of signal supplied to the terminals J, K and T. When the clear terminal CL receives a "1" signal, an output from the Q terminal maintains a state prevailing before the supply of said "1" signal. As shown in FIG. 3, where the clock pulse terminal T is impressed with a clock pulse with the clear terminal CL kept at "1", then the master-slave flip-flop circuit acts as a binary counter depending on an input to the J and K terminals.

There will now be described the operation of the inverter controlling circuit of FIG. 1 by reference to the wave form diagram of FIG. 4. When the switch 11 is thrown in (FIG. 4A), then a voltage +V is impressed on the terminals J1, J2 and K2 as well as on the time constant circuit, causing the terminal voltage of the capacitor C3 to be increased according to the associated time constant. Accordingly, a signal supplied to the clear terminal CL1 has a voltage level of "0" when the switch 11 is thrown in, whereas, after lapse of time $t1$, said voltage level attains "1" (FIG. 4C). At the end of the time $t1$, a clock pulse is generated under a stable condition (FIG. 4B). In the FF1 circuit at the end of time $t1$, the CL1 terminal has a "1" level, the J1 terminal has a "1" level when the switch 11 is thrown in (due to impression of a voltage +Vc), and the Q1 terminal also has a "1" level (FIGS. 3 and 4D), because the K1 terminal is earthed and kept at a "0" level. Therefore, the CL2 terminal also has a "1" level.

There will now be described the condition of an output from the FF2 circuit before the CL1 and CL2 terminals present a "1" level. During the time $t1$, the CL2 terminal is "0" level because the terminal Q1 is "0" level, therefore the terminal Q2 is "0" level (FIG. 2), and the terminal $\overline{Q2}$ is "1" level (FIG. 4F). Since the Q2 terminal has a "0" level, the voltage at point A has a "0" level (FIG. 4E). The voltage at point B stands at a level representing an AND output desired from an output from the $\overline{Q2}$ terminal and that from the Q1 terminal. Therefore, as long as the Q1 terminal has a "0" level and the $\overline{Q2}$ terminal has a "1" level, the voltage at point B has a "0" level ($\overline{Q2} \cdot Q1 = B$ in FIG. 4G).

There will now be considered an output level at point B immediately after the time $t1$. At this moment, the Q1 terminal has a "1" level (FIG. 4D) and the $\overline{Q2}$ terminal has a "1" level (FIG. 4F) and consequently an AND output at point B has a "1" level.

Referring to the FF2 circuit, the J2 and K2 terminals are already supplied with a "1" level of voltage when the switch 11 is thrown in and the J2 terminal is supplied with a clock pulse. When, therefore, the CL2 terminal is impressed with a "1" voltage immediately after the time $t1$, then the FF2 circuit carries out a flip-flop action as a binary counter according to the repeating period of the clock pulse. Namely, immediately after the time $t1$, the Q2 and $\overline{Q2}$ terminals present "0" and "1" levels alternately. At the aforesaid points A and B, therefore, are continuously generated rectangular waves having opposite phases (FIGS. 4E and 4G). Even if the clock pulse has unstable repeating period at its initial generation the repeating period will be stabilized within a time period $t1$. Therefore the first and second control signals will have constant repeating period from their initial generation time and good rectangular wave form. Accordingly, supply of these control signals to the switching transistor enables the inverter to effect a stable operation from the very start, and also stable rectangular waves to be supplied to a load from the beginning. Since an initial rectangular wave is found, as shown in FIG. 4, to be generated at point B, supply of a signal $g$ or $h$ to either of the first and second transistors determines which of these transistors should be operated first.

FIG. 5 shows the inverter controlling circuit connected to the thyristor inverter section. This arrangement has the same effect as that of FIG. 1, description thereof being omitted. It will be noted that the means for impressing a signal voltage +Vc on the input terminal of the master-slave flip-flop circuits and the arrangement of the time constant circuit are not limited to those used in the foregoing embodiment.

What we claim is:

1. In an inverter for periodically switching a D.C. source circuit by a first switching element controlled by a first signal and a second switching element controlled by a second signal so as to supply alternating current to a load, an inverter controlling circuit comprising a pair of first and second master-slave flip-flop circuits each provided with input terminals J, T and K, a clear terminal CL and output terminals Q and $\overline{Q}$, wherein the J terminal of the first master-slave flip-flop circuit and the J and K terminals of the second master-slave flip-flop circuit are connected together to be supplied with a "1" signal when the switching elements are impressed with the D.C. source voltage, the T terminals of the first and second master-slave flip-flop circuits are connected together to be supplied with a clock pulse, the K terminal of the first master-slave flip-flop circuit is kept at a "0" level, and the Q terminal of the first master-slave flip-flop circuit is connected to the CL terminal of the second master-slave flip-flop circuit; a time constant circuit which is energized when the jointly connected terminals J, T and K of the paired master-slave flip-flop circuits are supplied with "1" signal and, after the prescribed length of time after said energization, delivers a "1" signal to the CL terminal of the first master-slave flip-flop circuit; and a control signal supplying circuit which is connected to the Q and $\overline{Q}$ terminals of the second master-slave flip-flop circuit and the Q terminal of the first master-slave flip-flop circuit and supplies the first switching element with a first signal consisting of an output from the Q terminal of the second master-slave flip-flop circuit and also the second switching element with a second signal consisting of an AND output derived from an output from the $\overline{Q}$ terminal of the second master-slave flip-flop circuit and an output from the Q terminal of the first master-slave flip-flop circuit.

2. An inverter controlling circuit according to claim 1, wherein the control signal supplying circuit comprises a first diode having its cathode connected to the Q terminal of the second master-slave flip-flop circuit; a second diode whose anode is connected to the anode of the first diode and whose cathode constitutes the output terminal of a first control signal; a third diode having its cathode connected to the $\overline{Q}$ terminal of the second master-slave flip-flop circuit; a fourth diode whose anode is connected to the anode of the third diode and whose cathode constitutes the output terminal of a second control signal; a fifth diode having its cathode connected to the Q terminal of the first master-slave flip-flop circuit and its anode connected to the anodes of the third and fourth diodes; and a biasing means for supplying a bias voltage to the anodes of the first and second diodes through the corresponding common resistor and also the diodes of the third and fourth diodes through the corresponding common resistor.

* * * * *